Dec. 5, 1961 A. B. EUGA 3,011,832
BRAKE SYSTEM FOR VEHICLES
Original Filed Feb. 8, 1956 3 Sheets-Sheet 1

INVENTOR.
ARTHUR B. EUGA
BY
Schmieding and Fultz
ATTORNEYS

INVENTOR.
ARTHUR B. EUGA

3,011,832
BRAKE SYSTEM FOR VEHICLES
Arthur B. Euga, 728½ Franklin Ave., Columbus, Ohio
Original application Feb. 8, 1956, Ser. No. 564,315. Divided and this application Nov. 21, 1957, Ser. No. 697,969

14 Claims. (Cl. 303—54)

This application relates to braking systems for vehicles of the type wherein auxiliary braking means are provided for actuating the brake mechanisms upon failure of the service braking system of the vehicle.

The present application is a division of my co-pending Serial Number 564,315, filed February 8, 1956, now U.S. Patent No. 2,871,827 which is a continuation-in-part of my co-pending application Serial Number 176,785 filed July 31, 1950, now abandoned, and relates to certain modifications and improvements of the systems disclosed therein.

It is an object of the present invention to provide a novel valve means for a brake system for vehicles that serves to automatically actuate an auxiliary fluid brake system upon failure of a service fluid brake system.

It is another object of the present invention to provide a novel valve means that is particularly adaptable for use in the novel brake systems disclosed in my co-pending application Serial Number 564,315.

It is still another object of the present invention to provide a novel valve means that is particularly adaptable for use with the brake actuating motors disclosed in my co-pending application Serial Number 564,315.

Further objects and advantages of the present invention will be apparent from the following description, reference being had to the accompanying drawings wherein preferred forms of embodiments of the invention are clearly shown.

Figure 1:
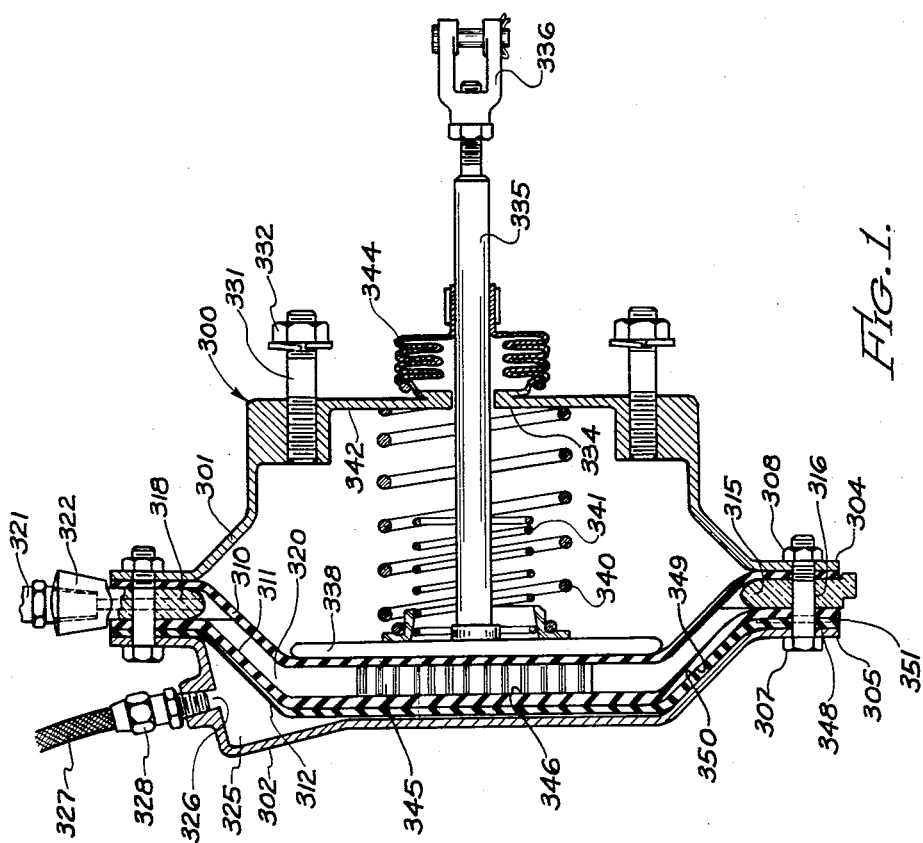
FIGURE 1 is a side elevational view of a brake actuating motor particularly adapted for use with the novel valve mechanism of the present invention.

FIGURE 1 illustrates a cylinder indicated generally at 300 which cylinder includes a forward casing portion 301 and a rear casing portion 302 provided with peripheral flange portions 304 and 305, respectively, joined together by a plurality of threaded elements 307 and 308. Cylinder 300 includes a first flexible diaphragm 310, a second flexible diaphragm 311 and a third flexible diaphragm 312 clamped between the flanged portions 304 and 305. An annular spacer member 315, disposed between diaphragms 310 and 311 is provided with a plurality of holes 316 through which bolts 307 are extended. Annular spacer member 315 includes a radially extending passage 318 communicating with a first sealed chamber 320. A line 321 connects passage 318 of spacer member 315, at a threaded fitting 322. Cylinder 300 includes a second sealed chamber 325 provided with a fluid intake opening 326 communicating wtih a fluid line 327 at a threaded fitting 328.

The two adjacently disposed diaphragms 311 and 312 form a double flexible wall means separating sealed chamber 320 from sealed chamber 325. It will be understood that chamber 320 can be connected with a service brake fluid circuit of the braking system and chamber 325 can be connected with a fluid circuit of an auxiliary braking system whereby chamber 320 becomes the service brake chamber and chamber 325 becomes the auxiliary brake chamber. These connections can be interchanged so that chamber 320 will function as an auxiliary brake chamber and chamber 325 will function as a service brake chamber.

The forward casing portion 301 of cylinder 300 may be provided with studs 331 and nuts 332 for securing the cylinder to the vehicle. The forward casing portion 301 includes a hole 334 through which is extended a brake actuating rod 335 provided with suitable means, such as clevis 336, for connecting rod 335 to conventional means, such as a slack adjustor and cams, not illustrated, for operating the brake shoes of the vehicle. The inner end of brake actuating rod 335 carries a plate element 338 which is contacted by a substantial portion of the area of flexible diaphragm 310. Compression springs 340 and 341 are disposed between plate element 338 and an inner surface 342 of the casing for urging the plate element 338 and diaphragm to the rearward position illustrated in FIGURE 1. A flexible boot 344 may be provided at the junction of actuating rod 335 and casing portion 301 to serve as a dirt seal for hole 334.

With continued reference to FIGURE 1, a spacer member 345 is shown disposed between diaphragms 310 and 311 with such spacer member being secured to one of the confronting surfaces of the diaphragms such as the surface 346. Spacer member 345 is preferably formed of the same material as the flexible diaphragms, such as synthetic rubber, and provides means for transmitting force from rear flexible diaphragms 311 and 312 to plate element 338 and actuating rod 335 when chamber 325 is pressurized.

As seen in FIGURE 1, a member 348 is shown positioned at a junction of confronting surfaces 349 and 350 of the diaphragms 311 and 312 and provide a vent 351 for the escape of fluid from between diaphragms 311 and 312 in the event one of said diaphragms is ruptured.

Figure 2:
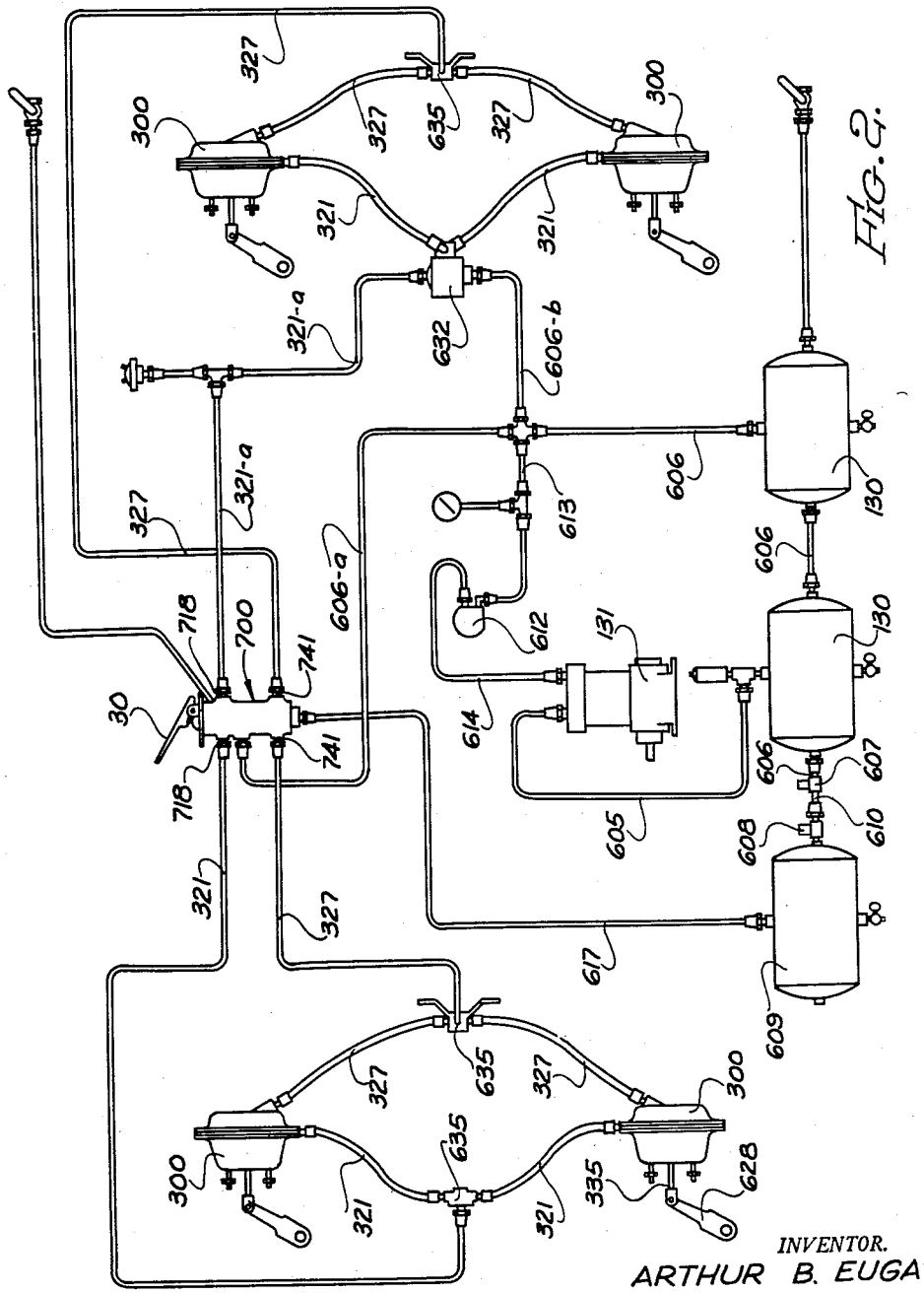
FIGURE 2 illustrates a brake system constructed according to the present invention and adapted for use with the novel valve mechanism of the present invention.

Referring next to FIGURE 2, a brake system is illustrated which utilizes the brake cylinder constructions of FIGURE 1 and the novel valve mechanism 700 of FIGURE 3, the latter being described later herein. Air from compressor 131 is delivered through line 605 to service reservoir 130 and thence through line 606 and pressure regulator valves 607 and 608 to auxiliary reservoir 609 whereby the reservoirs are charged.

When lever 30 is depressed, during normal operation of the service brake circuit of FIGURE 2, air is released from service brake reservoir 130 through lines 606, 606–a, port 800, valve 721, passage 718 of valve 700, and lines 321 to the service brake chambers of front brake cylinders 300. Air is also released through line 321–a to relay valve 632 which valve releases air directly from reservoir 130, line 606, line 606–b, valve 632 and lines 321 to the service brake chambers of rear brake cylinders 300.

Upon failure of the service brake circuit of FIGURE 2, when pedal lever 30 is depressed to a predetermined position at which the service brakes would ordinarily be actuated, no braking will occur in the service brake chambers of brake cylinders 300. Upon further movement, however, of pedal lever 30 beyond said predetermined position, an auxiliary valve mechanism, later to be described in connection with FIGURE 3, is caused to open whereby air can be released, in a controlled manner from auxiliary reservoir 609 through line 617, passage 741, and lines 327 to the auxiliary brake chambers of wheel cylinders 300.

The system of FIGURE 2 is also provided with quick release valves 635 located in lines 327 close to the wheel cylinders 300. These quick release valves 635 may be of the type well known to the art for use in service brake circuits, but in the system of the present invention these quick release valves 635 are incorporated in the auxiliary circuit in combination with the automatic valve mechanism 700, later to be described, in order to allow the driver of the vehicle to quickly release the auxiliary emergency brake circuit by merely decreasing foot pressure on the pedal lever 30. Such release of the pressure being applied to the auxiliary circuit and chambers is effected, with the present valve mechanism 700, in a controlled manner whereby the braking effect can be gradually applied or released, as required by the particular driving operation. This controlled operation is obtained, with valve mechanism 700, both in instances where a partial loss in the pressure in the service brake chambers occurs, and in instances where a complete loss of pressure in the service brake chambers occurs.

Figure 3:
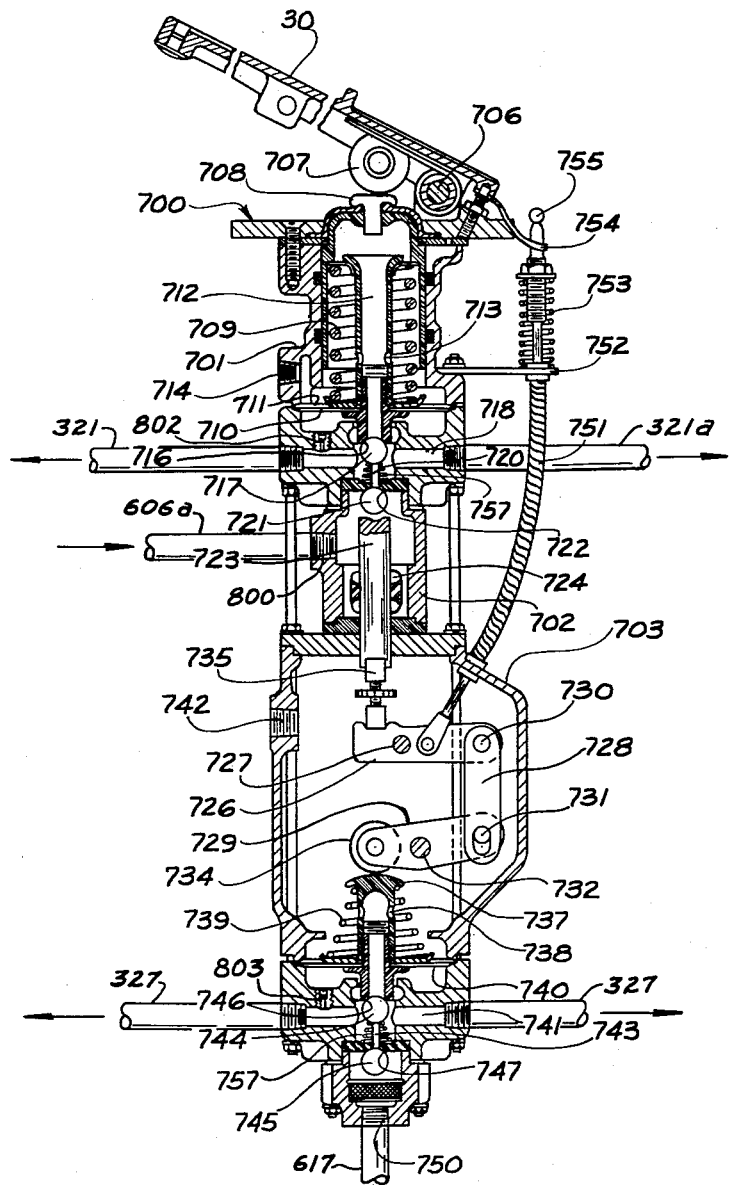
FIGURE 3 is a side sectional view of a novel valve mechanism constructed according to the present invention and adapted for use in the brake system of FIGURE 2.

Referring next to FIGURE 3 the novel valve mechanism 700 used in connection with the system of FIGURE 2 comprises a first casing portion 701, a second casing portion 702, and a third casing portion 703. Upper casing portion 701 carries an actuating lever 30 pivoted at 706 and provided with a roller 707 arranged to depress sleeve 708 downwardly against the action of spring 709. The lower end of spring 709 engages a seal washer 711 which overlies a moveable wall or diaphragm 710. The periphery of said diaphragm is supported by casing portion 701. A service actuator in the form of a tube 712 extends through diaphragm 710 and includes vent holes 713 which connect the interior of tube 712 with atmosphere at the vent 714. The lower end of service actuator 712 includes a seat 716 engaged by exhaust valve portion 717 moveably disposed in passage 718 leading to service brake chambers of the vehicle.

The moveable element 720 also includes an intake valve portion 721 arranged to move upwardly against a seat 722.

The lower end of moveable element 720 is engaged by the upper end of a plunger 723 which is slidably carried by casing portion 702 at a seal 724. The lower end of plunger 723 engages a lever 726 pivoted at 727 and pinned to link 728 at 730. The other end of link 728 is pinned to a second lever 729 at pin 731. Lever 729 is pivoted to casing portion 703 at a pivot 732 and carries a roller 734 which engages the upper end of an auxiliary actuator in the form of a tube 737. A spring 739 urges tube 737 upwardly with the lower end of tube 737 being secured to the center of a moveable wall or diaphragm 740. The periphery of diaphragm 740 is mounted to casing portion 703.

The lower end of auxiliary actuator 737 includes a seat 746 adapted to receive exhaust valve portion 744 of moveable element 743. The wall tube 737 includes holes 738 which communicate with a vent 742 through the wall of casing portion 703.

The exhaust valve portion 744 of moveable element 743 is disposed in passage 741 leading to the auxiliary brake chambers of the vehicle. The intake valve portion 745 of moveable element 743 is arranged to engage a seat 747 between passage 741 and intake passage 750, the latter being in communication with the auxiliary reservoir.

Each of the moveable elements 720 and 743 is urged upwardly by a small compression spring 757. A shielded cable 751 is attached at its lower end to lever 726.

The upper end of cable 751 extends through a hole in bracket 752 and is provided with a ball 755. An arm 754 mounted on lever 30 is engageable with ball 755 whereby tension is applied to cable 751 upon actuation of lever 30. A spring 753 urges the upper end of cable 751 upwardly at all times.

In operation of the valve mechanism 700, when lever 30 is depressed, and the service brake system is operating normally, the roller 707 depresses spring 709 and tube 712 whereby the intake valve portion 721 is depressed away from seat 722 whereby air is released from the service brake reservoir to the service brake cylinders of the vehicle with exhaust valve portions 717 being closed against seat 716. The amount the brake lever 30 is moved towards the fully applied position, or the position at which it is held, determines in exact relative proportion the air pressure delivered to and held in the brake chambers. This is true because the force from air pressure on the lower side of diaphragm 710, is equalized by the force applied to the upper side of diaphragm 710 by the action of lever 30 transmitted to the diaphragm 710 through spring 709. The lower side of diaphragm 710 is subjected to the existing air pressure being released through service outlet passage 718 due to the presence of air bleed passage 802 which releases air from outlet passage 718 to the chamber underlying diaphragm 710. Hence it will be understood the greater the service air pressure the greater will be the upwardly exerted force on diaphragm 710 which force opposes downward depression of pedal lever 30.

It should be pointed out that this type of valve includes a certain amount of travel over which the air application is gradually increased to some predetermined maximum pressure. Any further movement of the lever 30 and valve may be considered free travel during which full reservoir pressure is delivered to the brake chambers.

When lever 30 is actuated, and a failure of the service brake system occurs, such that sufficient braking pressure is not available from the service brake reservoir, when the lever 30 reaches a predetermined pressure point, at which full reservoir pressure would be available at passage 718, then the plunger 723 actuates lever 726, link 728, and lever 729 to depress tube 737 whereby the lower moveable element 743 is moved downwardly. This causes intake valve portion 745 to depart from seat 747 and air is thereby released from the auxiliary reservoir to the auxiliary brake chambers. The operation of the lower auxiliary valve mechanism, which includes the moveable element 743, is substantially identical to that of the upper service brake valve mechanism previously described. When exhaust valve portion 744 is closed and intake valve portion 745 is open, the force exerted by air pressure on the lower side of diaphragm 740 will equal the force applied to the upper side of diaphragm 740 by the action of lever 30 transmitted through the linkage previously described. An air bleed passage 803 connects the chamber underlying diaphragm 740 with auxiliary air outlet passage 741 whereby the under side of the diaphragm is subjected to the existing auxiliary air pressure. Hence it will be understood the greater the service air pressure the greater will be the upwardly exerted force on diaphragm 740 which force opposes downward depression of pedal lever 30.

When braking action is being applied to the service air chambers from passage 718 of valve mechanism 700, and it is desired to decrease the braking action, when the operator decreases the depression of lever 30, seat 716 will lift away from exhaust valve portion 717 whereby air is allowed to escape from the service brake chambers, through passage 718, tube 712, holes 713 and vent 714 to the atmosphere.

When braking action is being applied to the auxiliary air chambers from passage 741 of the valve mechanism 700, and the operator decreases the depression of lever 30, seat 746 is lifted away from exhaust valve portion 744 whereby air is allowed to escape from the auxiliary brake chambers, through passage 741, tube 737, holes 738 and vent 742 to atmosphere.

The cable 751 may be incorporated in the valve mechanism 700, in the manner previously described, to provide positive and direct mechanical linkage between lever 30 and auxiliary valve element 743. Hence if the spring 709 of the service valve mechanism should break or become inoperative, the auxiliary valve mechanism will still be actuated when lever 30 is depressed.

It should be pointed out that the effective lever arm of plunger 723, about fulcrum pin 727, is less in length than the effective lever arm of pin 730 about fulcrum pin 727. This provides a mechanical advantage whereby a relatively small movement of plunger 723 produces a greater travel and more rapid movement of roller 734. Hence it will be understood that a relatively small remaining movement of pedal 30, after complete actuation of the conventional service valve element 720, is utilized to effect a rapid and complete opening of auxiliary valve element 743.

It should also be pointed out that the effective lever arm of the lower end of sheathed cable end 751 about fulcrum 727 is of relatively short length as compared to the lever arm of pin 730 about fulcrum pin 727. Hence it will be understood that a mechanical advantage is achieved by lever 726 whereby a relatively small remaining movement of pedal lever 30, after actuation of service valve element 720, serves to effect a rapid and complete opening of auxiliary valve opening 743.

It should further be pointed out that a lost motion connection is provided between link 728 and lever 729 by slot 760 and pin 731. This lost motion connection allows normal action of service valve element 720, through its normal range of movement, without causing any movement of lever 729 or auxiliary valve element 743. When the pedal 30, however, is depressed beyond the position normally required to actuate service valve element 720 the lower end of slot 760 engages pin 731 and actuation of auxiliary valve 743 is instituted.

An additional lost motion connection is provided by arm 754 and ball 755 on the top of shielded cable 751. It will be understood that when pedal lever 30 is depressed beyond a position normally required to actuate service valve 720 the arm 754 is caused to engage ball 755. This applies tension to the inner cable element of sheathed cable 751 and provides a direct mechanical actuation of lever arm 726.

An adjusting element 735 is provided between the lower end of plunger 723 and the left end of lever 726. Adjusting element 735 includes a rotatable portion having an upper portion provided with a right hand thread and a lower portion provided with a left hand thread. Hence it will be understood that when the rotatable portion of adjusting element 735 is rotated the effective length of plunger 723 can be increased or decreased. This provides means for adjusting the amount of movement of pedal lever 30 required to institute operation of auxiliary valve element 743. This adjustment is made after installation of the valve mechanism 700 in the vehicle brake system. The adjustment can be made to suit the particular type of vehicle and will vary in accordance with the size of the equipment and load being carried. Moreover, some drivers prefer a quick actuation of the auxiliary system, whereas other drivers prefer a delayed action of the auxiliary system.

A similar adjustment can be made in the direct mechanical linkage provided by sheath cable 751. The stem portion carrying ball 755 is provided with an internally threaded bore in the bottom portion thereof which receives a threaded upper end of the interior cable element of sheath cable 751. Hence it will be understood that the effective length of the interior cable element of sheath cable 751 can be increased or decreased by rotating the stem portion carrying ball 755. Hence it will be understood that the amount of movement of pedal lever 30 required to actuate the direct mechanical linkage can be adjustably varied to suit the particular vehicle, load, and preference of the driver.

From the above it will be understood that with valve mechanims 700, applied to a system such as is illustrated in FIGURE 2, not only is the air supply to the service brake chambers increased or decreased in a controlled, metered manner, but, in addition, when the auxiliary brake system is automatically energized, the air supply to the auxiliary brake chambers is increased or decreased in the same controlled, metered manner by the same foot actuated lever. Hence it will be understood that when the service brake system, for any reason fails completely, or becomes inadequate, the auxiliary system automatically comes into play to give the driver not only the identical stopping power, but also the identical control he enjoyed prior to the failure of the service brake system.

While the forms of embodiments of the present invention as herein disclosed constitute preferred forms, it is to be understood that other forms might be adopted, all coming within the scope of the claims which follow.

I claim:

1. A fluid flow control mechanism for a braking system of the type wherein a service brake fluid circuit and an auxiliary brake fluid circuit are arranged to operate braking mechanism, said valve mechanism comprising, in combination, first housing means forming a service chamber and including a service intake valve seat and a service exhaust valve seat; a movable service valve element in said first housing means and including an intake closure for said intake seat and an exhaust closure for said exhaust seat; a service actuator engaging said service valve element; a flexible diaphragm including a first side in force transmitting relationship with said service actuator and a second side exposed to the interior of said service chamber; a pivoted lever for depressing said service actuator; second housing means forming an auxiliary chamber and including an auxiliary intake valve seat and an auxiliary exhaust valve seat, said auxiliary chamber being isolated from said service valve means when said auxiliary valve means is opened to pressurize said auxiliary brake fluid circuit; a movable auxiliary valve element in said second housing means and including an intake closure for said auxiliary intake seat and an exhaust closure for said auxiliary exhaust seat; an auxiliary actuator for said auxiliary valve element; a second flexible diaphragm including a first side in force transmitting relationship with said auxiliary actuator and a second side exposed to the interior of said auxiliary chamber; and linkage means connecting said auxiliary actuator with said pivoted lever.

2. The mechanism of claim 1 wherein said linkage means includes a lost motion connection.

3. A fluid flow control mechanism for a braking system of the type wherein a service fluid brake circuit and an auxiliary fluid brake circuit are arranged to operate brake motors, said mechanism comprising, in combination, a service housing means forming a service chamber and including a service intake valve seat and a service exhaust valve seat; a moveable service valve means in said service housing means and including an intake closure for said intake seat and an exhaust closure for said exhaust seat; a service actuator engaging said service valve means; a first moveable wall including a first side in force transmitting relationship with said service actuator and a second side exposed to the interior of said service chamber; a valve actuating member for movement by a vehicle operator along a first portion of a path of movement and along a second portion of a path of movement; a service linkage connection between said service actuator and said actuating member for opening and closing said service valve means responsive to movement of said actuating member along said first path portion; auxiliary housing means forming an auxiliary chamber and including an auxiliary intake valve seat and an auxiliary exhaust valve seat, a moveable auxiliary valve means in said auxiliary housing means and including an intake closure for said auxiliary intake seat and an exhaust closure for said auxiliary exhaust seat; an auxiliary actuator for said auxiliary valve means; a second moveable wall including a first side in force transmitting relationship with said auxiliary actuator and a second side exposed to the interior of said auxiliary chamber, said auxiliary chamber being isolated from said service valve means when said auxiliary valve means is opened to pressurize said auxiliary brake fluid circuit; and an auxiliary linkage connection between said auxiliary actuator and said valve actuating member for opening and closing said auxiliary valve means responsive to movement of said actuating member along said second path portion.

4. The apparatus defined in claim 3 wherein said service linkage includes a spring means operatively interposed between said valve actuating member and said first moveable wall.

5. The apparatus defined in claim 3 wherein said auxiliary linkage includes a spring means operatively interposed between said valve actuating member and said second moveable wall.

6. The apparatus defined in claim 3 wherein said auxiliary linkage includes a spring means operatively interposed between said valve actuating member and said second moveable wall; and a auxiliary exhaust valve means located between said outlet and a vent to atmosphere, said auxiliary exhaust valve means being operatively connected to said valve actuating member.

7. The apparatus defined in claim 3 wherein said auxiliary linkage connection includes a lost-motion connection whereby said auxiliary valve means is open only during movement of said valve actuating member along said second portion of said path of movement.

8. The apparatus defined in claim 3 wherein said auxiliary linkage connection includes a lost motion connection and a rod slidably carried by one of said housing means.

9. The apparatus defined in claim 3 wherein said auxiliary linkage connection includes a lost motion connection and a rod slidably carried by one of said housing means, one end of said rod means being normally spaced from but engageable with said service valve means.

10. The apparatus defined in claim 3 wherein said auxiliary linkage connection includes a lever pivotally attached to one of said housing means; means connecting said auxiliary valve means with said lever; and rod means movably carried by one of said housing means and connected to said lever.

11. The apparatus defined in claim 3 wherein said auxiliary linkage connection includes a lever pivotally attached to one of said housing means; means connecting said auxiliary valve means with said lever; rod means movably carried by one of said housing means and connected to said lever; and an adjusting means for varying the length of the connection between said rod means and said lever.

12. The apparatus defined in claim 3 wherein said auxiliary linkage connection includes a lever pivotally attached to one of said housing means; means connecting said auxiliary valve means with said lever; and an operator having one end connected to said lever and another end connected to said valve actuating member.

13. The apparatus defined in claim 3 wherein said auxiliary linkage connection includes a rod means slidably carried by one of said housing means; a first lever pivoted to one of said housing means and engaged by said rod means; a second lever pivoted to one of said housing means and connected with said auxiliary valve means; and a link having a first connection with said first lever and a second connection with said second lever, certain of said link connections being formed by a pin slidably carried in a slot, said pin and slot forming a lost-motion connection between said auxiliary valve means and said valve actuating member.

14. The apparatus defined in claim 3 wherein said auxiliary linkage connection includes a rod means slidably carried by one of said housing means; a first lever pivoted to one of said housing means and engaged by said rod means; a second lever pivoted to one of said housing means and connected with said auxiliary valve means; a link having a first connection with said first lever and a second connection with said second lever; and means forming an adjustable connection between said rod means and said first lever.

References Cited in the file of this patent

UNITED STATES PATENTS

| | | |
|---|---|---|
| 2,401,681 | Eaton | June 4, 1946 |
| 2,645,307 | Stegman | July 14, 1953 |
| 2,850,330 | Andrews | Sept. 2, 1958 |